Dec. 23, 1969     R. V. FLIPPO     3,485,255
FIXED JET SERVO VALVE
Filed May 2, 1966     3 Sheets-Sheet 3

ROBERT V. FLIPPO
INVENTOR
BY Harold E. Meier
ATTORNEY

United States Patent Office 3,485,255
Patented Dec. 23, 1969

3,485,255
FIXED JET SERVO VALVE
Robert V. Flippo, Dallas, Tex., assignor to LTV Electrosystems, Inc., Greenville, Tex., a corporation of Delaware
Filed May 2, 1966, Ser. No. 546,628
Int. Cl. F15b 9/03, 15/14
U.S. Cl. 137—83                 1 Claim

ABSTRACT OF THE DISCLOSURE

A hydraulic control valve having a pilot valve which includes a flapper pendularly suspended between two reverse-flow nozzles to control the amounts of fluid which are admitted to these reverse-flow nozzles, and having two forward-flow nozzles for directing fluid jets at respective chambers at the ends of a main valve spool, and further having ports interposed between respective forward-flow nozzles and associated chambers for the purpose of converting the kinetic energy of the fluid jets leaving the forward-flow nozzles into potential energy in the form of pressurized fluid in the chambers.

Figure 1:
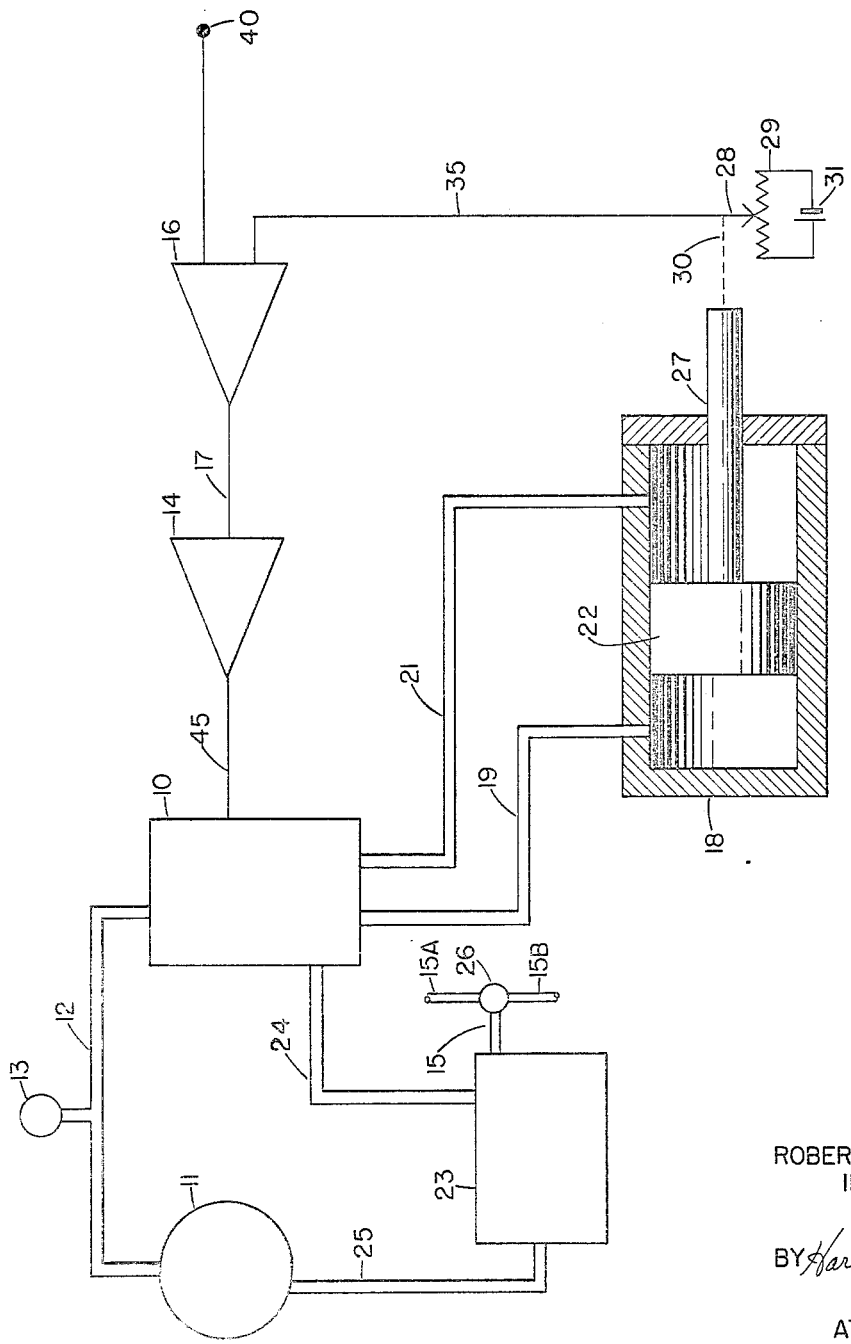

This invention relates to a hydraulic control mechanism and more particularly to a servo valve for controlling the flow of fluid through a control system.

Hydraulic servo valves are used extensively in many industrial and aeronautic (including rocket-powered space exploration) control systems where a low-powered signal must be amplified into a high-powered, fluid control pressure and/or flow. In aeronautic applications, valve size must be given critical consideration; thus, efforts are continually being made to produce smaller valves thereby necessitating the use of higher fluid control pressures. Use of high pressure control fluids has in the past caused problems tending to effect the reliability of servo-valves using a nozzle-flapper construction. In valves employing the nozzle-flapper construction, a flapper member is positioned by a torque motor to move between two opposed nozzles, each of which is placed downstream of a restriction. Movement of the flapper between the opposed nozzles generates a differential pressure across the ends of a valve spool slideably positioned in a cylinder in communication with the nozzles. The valve spool in turn is able to control flows of high-pressure fluid which may be large in comparison to the volume of flow through the respective nozzles. During the operation of nozzle-flapper servo valves, high-pressure fluid, which is continuously emitted from the nozzles, impinges on the flapper with the result that the flapper is subject to erosion by contaminants in the fluid, which erosion impairs accuracy of the valve's operation by changing the nozzle-to-flapper relationship. Another undesirable feature of present nozzle-flapper servo valves is that the nozzles become clogged with solid particles entrained in the fluid. By necessity, these nozzles are designed with gently sloping walls to which small particles easily adhere and build up until blockage of the nozzle opening results.

Nozzle-flapper servo valves for use with high-pressure fluids employ a flexure tube to effectuate a seal between the nozzle-flapper chamber and the atmosphere. This tube must be able to withstand the high fluid pressures and be able to flex as the flapper is positioned by the torque motor. The flexure tube thus developes a retarding force that attempts to return the flapper to its neutral position in opposition to the input signal. To negate this error-producing force, attempts were made to reduce the flexure tube thickness; however, such attempts resulted in a tube that is more susceptible to failure. Since the flexure tube wall thickness could not be reduced without affecting the valve's reliability, it was necessary to use a torque motor having a power output that positions the torque motor and overcomes the retarding force of the flexure tube.

Nozzle-flapper servo valves also have been plagued with the problem of slider friction, that is the requirement of an excessive amount of force to move the slider from a steady state position. This problem is most troublesome in valves that are repositioned infrequently.

Another construction used in servo valve design employs what is commonly known as the moving jet-pipe principle. The servo valve with a moving jet-pipe employs a torque motor to position the jet-pipe opening to be aligned with one of two closely spaced receiver ports. A stream of pressurized fluid is collimated by the pipe into a high-velocity stream which passes through the receiver ports into chambers formed by a valve spool in cooperation with a cylinder, in which the spool is slideably mounted. Servo valves using this construction are slow responding devices relative to the more common nozzle-flapper arrangement because of the inertia of the moving jet-pipe. In contemporary, high-performance airplanes, and in many industrial processes, the poor frequency response of the moving jet-pipe servo valve develops serious system limitations. Because a moving jet-pipe must be pivoted to move between the two receiver ports, servo valves using this principle are also sensitive to vibrations, which, in some systems, can become quite severe. In extreme cases, the jet-pipe may oscillate in the manner of a clock pendulum. A still further shortcoming of the servo valve with moving jet-pipe is the complicated, movable connection required to supply the pipe with pressurized fluid. Such connections make the valve difficult to assemble, clean and maintain.

Use of either the nozzle-flapper construction or the moving jet-pipe principle results in a servo valve that requires frequent maintenance and periodic adjustments of its components to ensure acceptable performance. With the nozzle-flapper configuration, excessively frequent adjustment or replacement of the flapper is required to compensate, to the extent possible, for flapper erosion and nozzle blockage. The moving jet-pipe similarly requires many periodic adjustments to ensure that the critical alignment between the moving pipe and the stationary receiving ports is maintained. Thus, it is a principal object of the invention to provide a servo-valve with a minimum of periodic adjustments.

Another object of the invention is to provide a servo valve with a high reliability.

A further object of the invention is to provide a servo valve relatively immune to contamination from particles entrained in the operating fluid.

Yet another object of the invention is to provide a fast-acting servo valve.

A still further object of the invention is to provide a servo valve which is of improved immunity to vibrational disturbances.

Still another object of the invention is to provide a servo valve employing simplified fluid connections.

An additional object of the invention is to provide a servo valve drawing a relatively small amount of power from a signal source and delivering a large amount of power to a control actuator.

Another object of the invention is to provide a servo valve capable of responding quickly to small input signals.

A further object of the invention is to provide a servo valve wherein the flow of operating fluid substantially eliminates errors resulting from the flapper seal.

Other objects and advantages of the invention will be apparent from the specification and claims and from the accompanying drawing illustrative of the invention.

Figure 2:
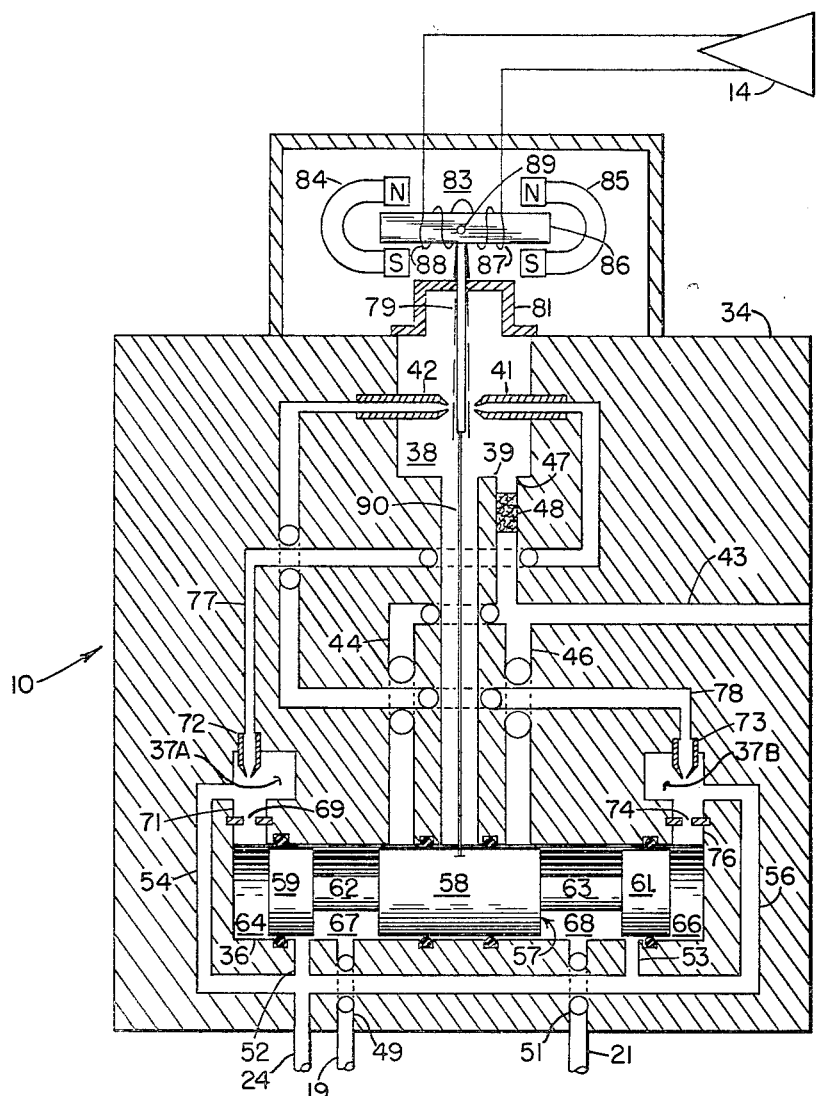
Figure 3:
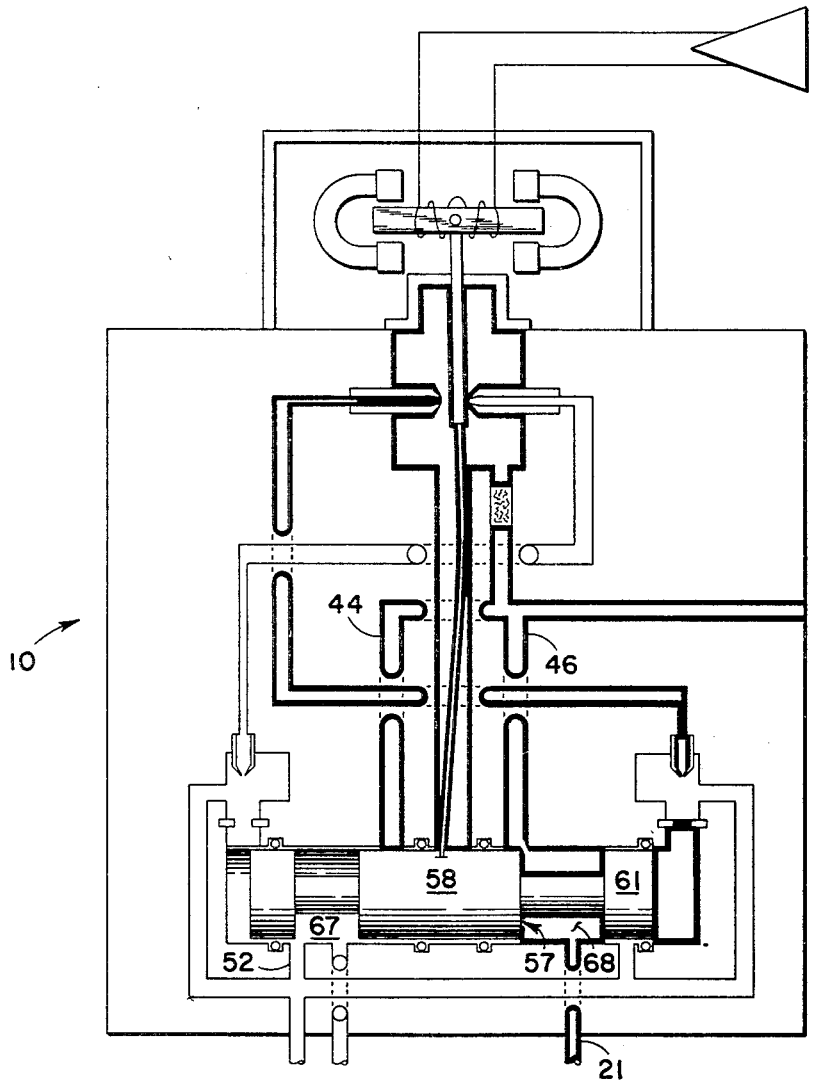

In the drawing:
FIG. 1 is a schematic diagram of a hydraulic control system including the servo valve of this invention;

FIG. 2 is a sectional schematic, partly in diagram, of one form of the servo valve of the invention; and FIG. 3 is a diagrammatic view of the valve shown in FIG. 2 in which the flapper is displaced to the right from its neutral position, and those passages and chambers which contain fluid at relatively high pressure are shown with heavy lines.

Referring to FIG. 1, there is shown a hydraulic control mechanism including the servo valve of this invention. Pressurized fluid is supplied to the servo valve 10 from a constant-pressure pump 11 by means of a pipe 12 interconnecting the pump and the servo valve. To maintain the connecting pipe 12 full of fluid at all times, an expansion tank 13 is connected to the pipe 12 at a point intermediate between the pump 11 and the servo valve 10. Electrically coupled to the servo valve 10 is a control amplifier 14 that generates a control current in response to the output of a summing amplifier 16, the summing amplifier 16, and the control amplifier 14, being interconnected by a line 17. In FIG. 1, the herein-described servo valve 10 is employed to control the flow of fluid to a power actuator 18 connected by pipes 19, 21 to the output connections of the servo valve 10. Control fluid from the servo valve 10, enters the power actuator 18 on one side of a piston 22 and simultaneously is returned to the servo valve from the power actuator 18 at the opposite side of the piston. The returned fluid passes through the servo valve 10 to a pressurized reservoir 23 connected to the valve by means of a return pipe 24. Connected to the reservoir 23 by means of a pipe 15 is a pressure regulator 26 that maintains a substantially constant pressure in the reservoir 23, the return pipe 24, and the servo valve 10. The pressure regulator 26 can be anyone of many well known designs, it is connected to a source of high-pressure air, not shown, by means of a pipe 15A. The regulator 26 maintains the reservoir 23 at a substantially constant pressure by bleeding the excess pressure to the atmosphere through a pipe 15B. The pressurized reservoir 23 is connected to the input of the constant-pressure pump 11 through a pipe 25.

Coupled to the piston 22 is a piston rod 27 extending through an opening in one end of the actuator cylinder. Mechanically connected to the external end of the piston rod 27 by means 30 is the wiper arm 28 of a potentiometer 29 connected to a source of D.C. voltage, shown schematically as a battery 31. The wiper arm 28 is electrically coupled, as by a line 35, to one input of the summing amplifier 16; the second input to the summing amplifier 16 is the position control signal, that is, the signal representing the desired position of the piston rod as supplied to the input terminal 40.

FIG. 2 shows the servo valve 10, of FIG. 1, in greater detail. Basically, the servo valve 10 consists of two sections: an electrically responsive input unit and a hydraulic control unit. The hydraulic control unit consists of a valve housing 34 having a cylindrical bore 36 and two cavities 37A, 37B in communication with said bore. The cavity 37A connected to the far left end of the cylinder 36, and the cavity 37B connects to the far right end of the cylinder. Also included within the housing 34 is a nozzle-flapper (N-F) chamber 38 having a port 39 opening thereinto for supplying pressurized fluid to the chamber. Mounted to extend into the N-F chamber 38 are two reverse-flow (R-F) nozzles 41, 42 arranged in diametrical opposition to each other.

Pressurized fluid is supplied (from a source not shown) to the valve mechanism through an input passage 43 including supply passages 44, 46 opening into the cylindrical bore 36, as will be described later, and a supply passage 47 opening into the N-F chamber 38. Contained with the supply passage 47 is a filter 48, for removing undesirable foreign particles which might be entrained in the fluid. In addition to the supply passages 44, 46 opening into the cylinder 36, there are branch passages 49, 51 for supplying control fluid to the power actuator 18, and return passages 52, 53 that provide means for discharging fluid from the servo valve 10 to the reservoir 23. The cavity 37A also has a passage 54 opening thereinto to provide a means for allowing the operating fluid to be returned to the reservoir 23; similarly, the cavity 37B has a passage 56 opening thereinto to provide means for returning fluid to the reservoir 23.

Slideably mounted within the cylindrical bore 36 is a valve spool 57 having a center piston 58 and end pistons 59, 61. The center piston 58 connects to the end piston 59 by means of an extension rod 62 and to the end piston 61 by means of an extension rod 63. The end piston 59 cooperates with the cylinder to form a left chamber 64 and the end piston 61 cooperates with the cylinder to form a right chamber 66. Two control chambers 67, 68 are formed between the end pistons 59, 61 and the center piston 58 by cooperation of the valve spool 57 with the cylindrical bore 36. Each of the three pistons 58, 59, 61 serves to control the flow of fluid through one or more of the previously described passages opening into the cylinder 36.

The return passages 52, 53 and the supply passages 44, 46 open into the cylinder 36 such that, with the valve spool 57 in a neutral position (as shown), the end piston 59 restricts the flow of fluid through the return passage 52, the end piston 61 restricts the flow of fluid through the return passage 53, and the center piston 58 restricts the flow of fluid through the supply passages 44, 46. A left displacement of the valve spool 57 from its neutral position moves the end piston 59 to allow fluid to flow to the return passage 52 from the chamber 67 and moves the center piston 58 to allow fluid to flow from the supply passage 46 into the chamber 68. With the valve spool 57 displaced to the left of its neutral position, the supply passage 44 and the return passage 53 remain effectively closed off by the center piston 58 and the end piston 61 respectively. Such a position is shown in FIG. 3. A right displacement of valve spool 57 from its neutral position moves the end piston 61 to allow fluid to flow to the return passage 53 from the chamber 68 and moves the center piston 58 to allow fluid to flow from the supply passage 44 into the chamber 67. With the valve spool 57 displaced to the right of its neutral position, the supply passage 46 and the return passage 52 remain effectively closed off by the center piston 58 and the end piston 59 respectively. The branch passages 49 and 51 open into the chambers 67 and 68 respectively, regardless of the position of the valve spool 57.

Opening into the cavity 37A and aligned to discharge a fluid stream through said cavity into the left-hand chamber 64, through a converter port 69 mounted in a passage 71 connecting the cavity 37A with the left-hand chamber 64, is a left-hand jet-pipe 72. Opening into the cavity 37B is a right-hand jet pipe 73; it is also aligned to discharge a fluid stream through the cavity and a converter port 74 mounted in a passage 76 connecting the cavity 37B with the right-hand chamber 66. The left-hand jet-pipe 72 is coupled to the R-F nozzle 41 by means of a fluid passage 77 and the right-hand jet-pipe 73 is coupled to the R-F nozzle 42 by means of fluid passage 78.

Pendularly mounted to an armature 86 of a torque motor 83, between the opposed R-F nozzles 41, 42, is a flapper member 79 for controlling the fluid flow through said nozzles and consequently through the left and right-hand jet-pipes 72, 73. In sealing engagement with the flapper member 79 is a flexure tube 81 attached to the valve housing 34. The torque motor 83 connects to the flapper member 79 at a point external to the N-F chamber 38. This motor can be any one of many designs; it can be pneumatically, hydraulically or electrically responsive. As shown, the motor is electrically responsive to the current control signal from the control amplifier 14. Structurally, the torque motor 83 consists of two U-shaped permanent magnets 84, 85, a pivotally mounted armature 86 connected to the flapper member 79, and two interconnected current coils 87, 88 wound on opposite ends of the armature.

Referring to FIGS. 1 and 2, an operator would position a master controller (not shown) to generate a signal proportional to the desired position of the power actuator 18. This signal is compared in the summing amplifier 16, with the signal at the wiper arm 28 of the feedback potentiometer 29. The summing amplifier 16 in turn generates a signal at its output terminal that is proportional to the difference between its input signals. This error signal is connected to the input terminal of the control amplifier 14 by means of line 17; the control amplifier 14 produces a current control signal proportional to the signal at its input terminal. The current output signal of the control amplifier 14 flows through line 45 to servo valve 10, then through the armature coils 87, 88 of the torque motor 83, resulting in armature rotation around a pivot point 89. Rotation of the armature 86 causes the flapper member 79 to change position, thereby changing the spatial relationship between the R-F nozzles 41, 42 and the flapper 79.

When a zero difference exists between the position signal and the feedback signal, no current flows through the armature coils 87, 88. As a result, the flapper 79 is in a neutral position midway between the ends of the R-F nozzles 41, 42. With the flapper 79 in a neutral position, the flow of fluid through the nozzles is equal, and the amount and velocity of fluid being discharged from the left-hand jet-pipe 72 equals that discharged from the right-hand jet-pipe 73. Jet-pipe servo valves operate on a principle similar to that of jet pumps; a discussion of the operation of one jet-pipe will be sufficient for providing understanding of the operation of the herein disclosed servo valve, for both pipes have identical operating characteristics. Considering the left-hand jet-pipe 72, fluid being emitted from the pipe throat is collimated into a high-velocity stream that is aligned to pass through the converter port 69 into the left-hand chamber 64. The fluid stream being emitted from the pipe throat impinges on the walls of left-hand chamber 64, or on fluid already contained within the chamber, whereby its kinetic energy is changed to pressure energy. Thus, the fluid pressure of the left-hand chamber 64 varies directly with the kinetic energy of the fluid discharged from the left-hand jet-pipe 72.

The fluid jet being emitted from the left-hand jet-pipe 72 actually passes through the converter port 69 only during translation of the valve spool 57 away from the jet-pipe 72. When the valve spool 57 is without motion relative to the cylinder 36, the fluid does not pass through the converter port 69 because the fluid in chamber 64 is at substantially the same pressure as the fluid in jet-pipe 72; hence the fluid jet merely impinges on the fluid already contained within the left-hand chamber 64. Since it cannot enter the left-hand chamber 64, it merely splashes back into the cavity 37A; however, this operation causes the valve-spool 57 to be in a constant dithering or agitated state which substantially eliminates the effect of static friction of the valve-spool in the cylinder 36. The energy conversion, however, still takes place, thus maintaining a given pressure in the chamber. To ensure identical operation of both jet-pipes, the cavities 37a, 37b are maintained full of fluid at all times, at a substantially constant pressure, by their connection to the pressurized reservoir 23, by means of the return passages 54, 56.

Next, assume a difference exists between the position signal connected to terminal 40 and the feedback signal from the potentiometer 29; the result is a current output from the summing amplifier 14 which in turn results in rotation of the armature 86 about its pivot point 89 by an amount proportional to the magnitude of the difference. A counter-clockwise rotation of the armature 86 moves the flapper member 79 towards the right R-F nozzle 41 and away from the left R-F nozzle 42. When the flapper member 79 rotates in a counter-clockwise direction, the fluid flowing from the N-F chamber 38 between the flapper member and the nozzle 41 generates a suction force that is larger than the suction force caused by fluid flowing between the flapper member and reverse-nozzle 42; the disparity in suction forces produces a resulting force that substantially negates the retarding force generated by the flexure tube 81. The force generated on the flapper member 79 is in a direction that assists the torque motor 83. This force results in several advantageous features; it permits the use of a less powerful torque motor 83 and a thicker-walled flexure tube 81. The thicker-walled flexure tube 81 substantially reduces valve failures due to breakage of the flexure tube.

Counter-clockwise movement of the flapper member 79 reduces the flow of fluid from the N-F chamber 38 through the right R-F nozzle 41 and increases the flow through the left R-F nozzle 42. Consequently, the flow of fluid from the left-hand jet-pipe 72 is cut back, and the flow from the right-hand jet-pipe 73 is increased. An increase in the fluid flowing from a jet-pipe increases the kinetic energy of the collimated stream which results in a higher pressure being developed in the associated chamber. In the present example, the pressure in the right-hand chamber 66 becomes greater, and the pressure in the left-hand chamber 64 is lowered. An unbalance of pressures exists in the two opposed chambers at opposite ends of the valve spool 57, thus causing it to move from right to left.

Movement of the valve spool 57 to the left causes the center piston 58 to effectively open the supply passage 46, thereby permitting fluid to flow from the constant-pressure pump 11 to the power actuator 18 through the connecting pipe 21 (FIG. 1). Simultaneously, the left piston 59 effectively opens the return passage 52, thereby allowing fluid to flow from the power actuator 18 to the pressurized reservoir 23. As fluid enters the chamber on the right side of the piston 22 of the power actuator 18, other fluid is forced from the left chamber and the piston 22 moves from right to left. This motion continues as long as the valve spool 57 is disposed from a neutral position and fluid flows through the servo-valve 10. The valve spool 57 continues to move so long as the flapper member 79 is displaced from its neutral position.

The lightweight construction of the armature 86 and the flapper member 79, compared to the heavy construction of a moving jet-pipe valve, operating in conjunction with the jet-pipes 72, 73 reduces the time delay between the generation of an error signal at the output terminal of the summing amplifier 16 and movement of the valve spool 57. An error signal is quickly converted into a change in fluid flow being emitted from the jet-pipes 72, 73. Also, the use of a relatively lightweight flapper member 79 causes the magnitude of the error signal to be in the milliampere range or lower. Further, this lightweight construction and the fixed position of the jet-pipes 72, 73 improves the valve's immunity to vibrational disturbances.

Movement of the valve spool 57, as described above, causes the feedback spring 90 to exert a clockwise force on the flapper member 79 that attempts to rotate the flapper member to its neutral position. As explained previously, with the flapper member 79 in a neutral position, the flow of fluid through the R-F nozzles is equal. Also, the kinetic energy of the fluid at one jet-pipe equals that at the other and the differential pressure across the valve spool 57 is zero. If the valve spool comes to rest at a position displaced from its neutral position, fluid will continue to flow to and from the power actuator 18.

As the flow of fluid continues to the power actuator 18, the piston and piston rod continue to move, and since the wiper arm 28 of the feedback potentiometer 29 is mechanically linked to the piston rod, a new feedback signal is generated. The new feedback signal changes in a direction to reduce the error signal generated by the summing amplifier 16. A reduction in the error signal reduces the armature current of the torque motor 83, thus causing the flapper member 79 to be rotated in a clockwise direction and toward its neutral position. Now, however, the flapper will move to close off the left R-F nozzle 42 and allow more fluid to flow through the right R-F nozzle 41, and the differential pressure now developed across the valve spool 57 forces it to move from let to right. The center piston 58 begins to effectively close off the supply passage 46 supplying fluid to the power actuator 18, and the left-end piston 59 begins to restrict the flow of fluid from the actuator to the pressurized reservoir 23. Eventually, the feedback signal equals the position signal, indicating that the piston rod 27 is in the desired position; and the current flow through the torque motor armature coils is zero. A zero current flowing through the armature 86 causes the flapper member 79 to assume its neutral position and the valve spool 57 will eventually return to its neutral position, thus stopping the flow of fluid to and from the power actuator 18.

The fixed jet-pipe valve significantly reduces the complexity of the fluid connections and improves the valve's reliability by using only stationary fluid passages. A reverse-flow nozzle, fixed jet-pipe valve further increases the valve's reliability by reducing the effect of nozzle contamination from fluid entrained particles. With forward nozzle flow, the small foreign particles can build up on the gently sloping sides of the nozzle; whereas with the reverse flow operation, this problem is not present.

While only one embodiment of the invention has been described in detail herein and shown in the accompanying drawing, it will be evident that various modifications are possible in the arrangement and construction of its components without departing from the scope of the invention.

I claim:
1. A hydraulic control mechanism comprising:
   a housing having a first and a second cavity and a cylindrical bore with a plurality of fluid passages opening thereinto;
   a valve spool having a center piston and right and left end pistons, said spool being positioned within the cylindrical bore to form opposed right and left chambers between the respective end pistons and the ends of said bore, and said spool being slideably mounted to control the flow of fluid through the plurality of passages;
   a first converter port interposed and providing communication between the first cavity and the right chamber, said port having a longitudinal axis;
   a right nozzle coaxially aligned with and spaced from the first port to direct a fluid jet at said first port such that the fluid jet will pass into said first converter port and thence into said right chamber when the pressure in said right chamber is appreciably less than the pressure immediately up-stream of said right nozzle;
   a second converter port interposed and providing communication between the second cavity and the left chamber;
   a left nozzle coaxially aligned with and spaced from the second port to direct a fluid jet at said second port such that the fluid jet will pass into said second converter port and thence into said left chamber when pressure in said left chamber is appreciably less than the pressure immediately up-stream of said left nozzle;
   a supply chamber in said housing which is filled with high-pressure fluid so as to constitute a source of substantially constant pressure fluid;
   a pair of closely spaced reverse-flow nozzles extending into the supply chamber on opposite sides thereof so as to constitute right and left reverse-flow nozzles, each of which is adapted to receive fluid from the supply chamber;
   a flapper pendularly suspended between the two reverse-flow nozzles and adapted to inhibit the flow of fluid through a given one of the reverse-flow nozzles while simultaneously increasing the flow of fluid through the other of the reverse-flow nozzles as a result of the flapper being moved so that it is closer to the given one than to the other nozzle;
   a first passage which provides communication between the left reverse-flow nozzle and the right nozzle, whereby the quantity of fluid admitted to the left reverse-flow nozzle affects the velocity of the fluid jet exiting from the right nozzle which in turn affects the pressure of fluid in the right chamber;
   a second passage which provides communication between the right reverse-flow nozzle and the left nozzle, whereby the quantity of fluid admitted to the right reverse-flow nozzle affects the velocity of the fluid jet exiting from the left nozzle which in turn affects the pressure of fluid in the left chamber;
   means responsive to the movement of said valve spool for urging the flapper toward a position intermediate the reverse-flow nozzles, said means consisting of a resilient member connecting the flapper and the valve spool; and
   means for selectively moving the flapper from a position where it is equidistant from the two reverse-flow nozzles in response to an input signal.

References Cited

UNITED STATES PATENTS

| | | | |
|---|---|---|---|
| 2,824,574 | 2/1958 | Place | 137—625.62 |
| 2,993,477 | 7/1961 | Panissidi | 137—625.63 |
| 826,979 | 7/1906 | Wilkinson | 137—83 X |
| 2,225,518 | 12/1940 | Blasig | 137—83 X |
| 2,800,143 | 7/1957 | Keller | 91—52 X |
| 3,023,781 | 3/1962 | Larsen | 91—52 X |
| 3,023,782 | 3/1962 | Chaves | 137—85 |
| 3,082,781 | 3/1963 | Moosmann. | |

ALAN COHAN, Primary Examiner

U.S. Cl. X.R.

137—85, 625.62, 625.63, 625.64

UNITED STATES PATENT OFFICE
CERTIFICATE OF CORRECTION

Patent No. 3,485,255  December 23, 1969

Robert V. Flippo

It is certified that error appears in the above identified patent and that said Letters Patent are hereby corrected as shown below:

Column 2, line 23, "vibrations," should read -- vibrations --. Column 4, line 73, "85," should read -- 85 --. Column 6, line 2, "nozzle" should read -- elzzon --; line 39, "disposed" should read -- displaced --. Column 7, line 23, "fluid entrained" should read -- fluid-entrained --; line 26, "operation," should read -- operation --.

Signed and sealed this 7th day of July 1970.

(SEAL)
Attest:

Edward M. Fletcher, Jr.  WILLIAM E. SCHUYLER, JR.
Attesting Officer  Commissioner of Patents